(12) United States Patent
Barnes et al.

(10) Patent No.: US 12,674,088 B1
(45) Date of Patent: Jul. 7, 2026

(54) SYSTEMS AND METHODS FOR APPLYING A BIOCIDE USING A PRECURSOR BIOCIDE

(71) Applicant: Cameron International Corporation, Houston, TX (US)

(72) Inventors: Paul Barnes, Aberdeen (GB); James Fajt, College Station, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/236,465

(22) Filed: Jun. 12, 2025

Related U.S. Application Data

(63) Continuation-in-part of application No. 19/182,667, filed on Apr. 18, 2025.

(51) Int. Cl.
| | |
|---|---|
| *E21B 43/34* | (2006.01) |
| *C09K 8/60* | (2006.01) |
| *E21B 37/06* | (2006.01) |

(52) U.S. Cl.
CPC .............. *C09K 8/605* (2013.01); *E21B 37/06* (2013.01)

(58) Field of Classification Search
CPC .......... E21B 43/34; E21B 37/06; C09K 8/605

USPC ......................................................... 166/312
See application file for complete search history.

(56) References Cited

U.S. PATENT DOCUMENTS

| | | | | |
|---|---|---|---|---|
| 7,902,124 B2 * | 3/2011 | Ali | ............................ | C11D 1/90 |
| | | | | 166/305.1 |
| 9,018,141 B2 * | 4/2015 | Kolari | .................... | C09K 8/605 |
| | | | | 166/305.1 |
| 2012/0142563 A1 * | 6/2012 | Cassidy | ................... | C09K 8/74 |
| | | | | 507/244 |
| 2015/0275067 A1 * | 10/2015 | Kabbani | .................. | C09K 8/03 |
| | | | | 507/214 |
| 2025/0320402 A1 | 10/2025 | Barnes | | |

\* cited by examiner

*Primary Examiner* — William D Hutton, Jr.
*Assistant Examiner* — Ashish K Varma
(74) *Attorney, Agent, or Firm* — Kyle R. Miiller

(57) ABSTRACT

A method for applying a biocide to a wellbore includes providing a precursor biocide to a location within a wellbore extending through an earth formation, the precursor biocide comprising an acetal or a hydroxyaldehyde, and reacting the precursor biocide in the wellbore or the earth formation in-situ to form a biocide comprising propenal. The method may further include treating the wellbore for effects of microorganisms using the biocide. Related methods and systems for applying the biocide to the wellbore are also disclosed.

15 Claims, 9 Drawing Sheets

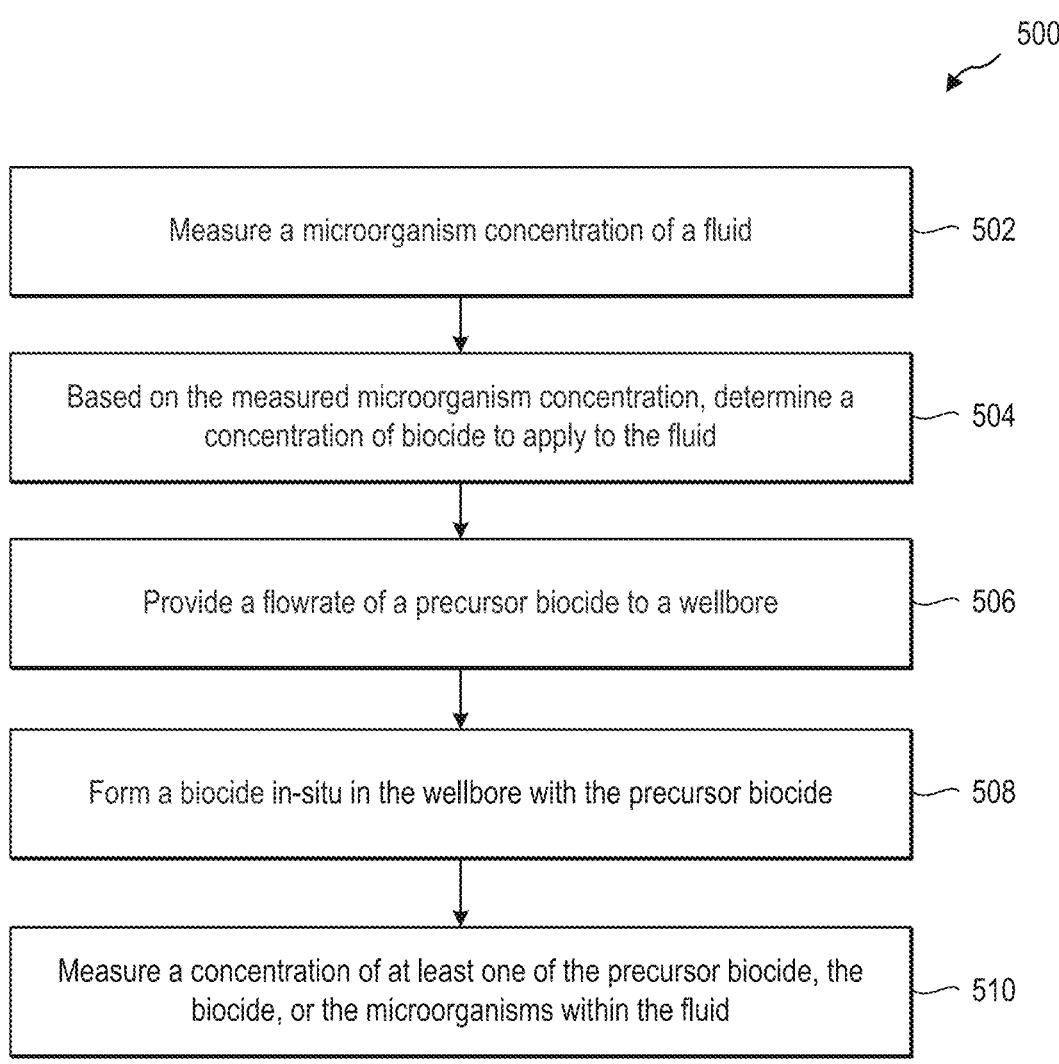

500

502　Measure a microorganism concentration of a fluid

504　Based on the measured microorganism concentration, determine a concentration of biocide to apply to the fluid 506　Provide a flowrate of a precursor biocide to a wellbore 508　Form a biocide in-situ in the wellbore with the precursor biocide 510　Measure a concentration of at least one of the precursor biocide, the biocide, or the microorganisms within the fluid

FIG. 5

SYSTEMS AND METHODS FOR APPLYING A BIOCIDE USING A PRECURSOR BIOCIDE

CROSS REFERENCE TO RELATED APPLICATION

This application is a continuation-in-part to and claims priority to and the benefit of U.S. patent application Ser. No. 19/182,667, filed on Apr. 18, 2025, entitled "SYSTEMS AND METHODS FOR SCAVENGING SULFUR-CON- TAINING MATERIALS USING A PRECURSOR SCAV- ENGER MATERIAL," the disclosure of which is hereby incorporated herein by reference in its entirety by this reference.

FIELD

The present disclosure generally relates to wellbore addi- tives, for example as used in the oil and gas industry, and more particularly to use of scavengers for sulfur-containing materials for use in a wellbore and biocides for microor- ganisms present in the wellbore. In particular, the present disclosure relates to methods and systems for forming a hydrogen sulfide and mercaptan scavenger and/or a biocide in-situ in a wellbore or earth formation.

BACKGROUND

Many oilfield operations include the circulation of a fluid into and/or through a borehole or wellbore. Such fluids may include drilling fluids that are circulated during the drilling of the well, completion fluids that are circulated during or after drilling, and fracturing fluids which are used after drilling to stimulate the well to increase production from a hydrocarbon reservoir.

After a well is drilled into a subterranean earth formation that contains hydrocarbons (e.g., oil, natural gas) and/or water, one or more operations may be performed to increase the production of the hydrocarbons. To increase the perme- ability and flow of the formation fluids to the surface, the wells are often subjected to stimulation operations. Stimu- lation generally refers to several post drilling processes used to clean the wellbore, enlarge channels, and increase pore space of the earth formation in the region (zone) of the earth formation to be injected, increasing the permeability of that region of the earth formation.

During production operations in which hydrocarbons or other materials are produced from the wellbore (e.g., from a subterranean formation), the wellbore and wellbore equip- ment may be exposed to various corrosive liquids and gases. For example, produced fluids may include hydrogen sulfide and thiols (also known as mercaptans), such as meth- anethiol, which may be corrosive and damage the wellbore and wellbore equipment. Such sulfur-containing species may be naturally occurring, may be present via action of sulfur-reducing bacteria and/or archaea, or may otherwise be present in the produced fluids. In addition to corrosion issues, the hydrogen sulfide and thiols may be hazardous to wellbore workers and are also considered environmental pollutants. For example, mercaptans are rapidly absorbed through inhalation and through skin and eye contact and lead to adverse health consequences. In addition, hydrogen sul- fide, even at very low concentrations, can be fatal.

Current methods of scavenging wellbore fluids for hydro- gen sulfide and mercaptans include introducing scavenger materials including formaldehyde-based scavengers, organic scavenger materials, triazine-based materials (e.g., hexahydro-1,3,5-tris(hydroxyethyl)-s-triazine), monoetha- nolamine (MEA) triazine, glyoxal-based scavenger materi- als, metal-based scavengers (e.g., iron salts, zinc salts), or chelating agents. However, such scavenging materials may form non-volatile byproducts that may cause fouling and blockage, may have limited efficiencies at high sulfide (e.g., hydrogen sulfide) loadings, may cause corrosion, may have environmental concerns, may have compatibility issues with emulsions in the wellbore, may have poor reaction kinetics under wellbore conditions, may not be compatible with other materials located in the wellbore, such as scale inhibi- tors, biocides, and demulsifiers, and may have high cost.

In addition, while water may be used in many wellbore fluids (e.g., drilling fluids, stimulation fluids, fracturing fluids, completion fluids, other fluids), the water may con- tain microbes, such as bacteria, fungus, etc., that can grow and proliferate on the surface of the wellbore, downhole, and/or on wellbore equipment. Biocides and antimicrobials may be used to inhibit, reduce, and/or remove microbial growth in the water. If left untreated, microbes and microbial biofilms (slimes) can cause deterioration of equipment, loss of efficiency in equipment, promotion and acceleration of corrosion on metal surfaces, or increased down time.

BRIEF SUMMARY

In some configurations, a method for applying a biocide to a wellbore comprises providing a precursor biocide to a location within a wellbore extending through an earth for- mation, the precursor biocide comprising an acetal or a hydroxyaldehyde, and reacting the precursor biocide in the wellbore or the earth formation in-situ to form a biocide comprising propenal.

In some embodiments, a method of applying a biocide to a wellbore comprises providing a precursor biocide to a location within a wellbore extending through an earth for- mation, the precursor biocide comprising at least one of acrolein diethyl acetal, acrolein ethylene glycol acetal, or 3-hydroxypropanal, and responsive to exposure to an acid or water in the wellbore, forming a biocide comprising prope- nal in the wellbore from the precursor biocide.

In some embodiments, a system for providing a biocide to a wellbore comprises an injection pump in fluid communi- cation with a precursor biocide, the precursor biocide com- prising an acetal or a hydroxyaldehyde, and wellbore piping in fluid communication with the injection pump and con- figured to provide the precursor biocide to a downhole location.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 5 is a simplified flow diagram illustrating a method of applying a precursor wellbore additive comprising a precursor biocide to a wellbore, according to at least one embodiment of the disclosure;

DETAILED DESCRIPTION

Figure 1:
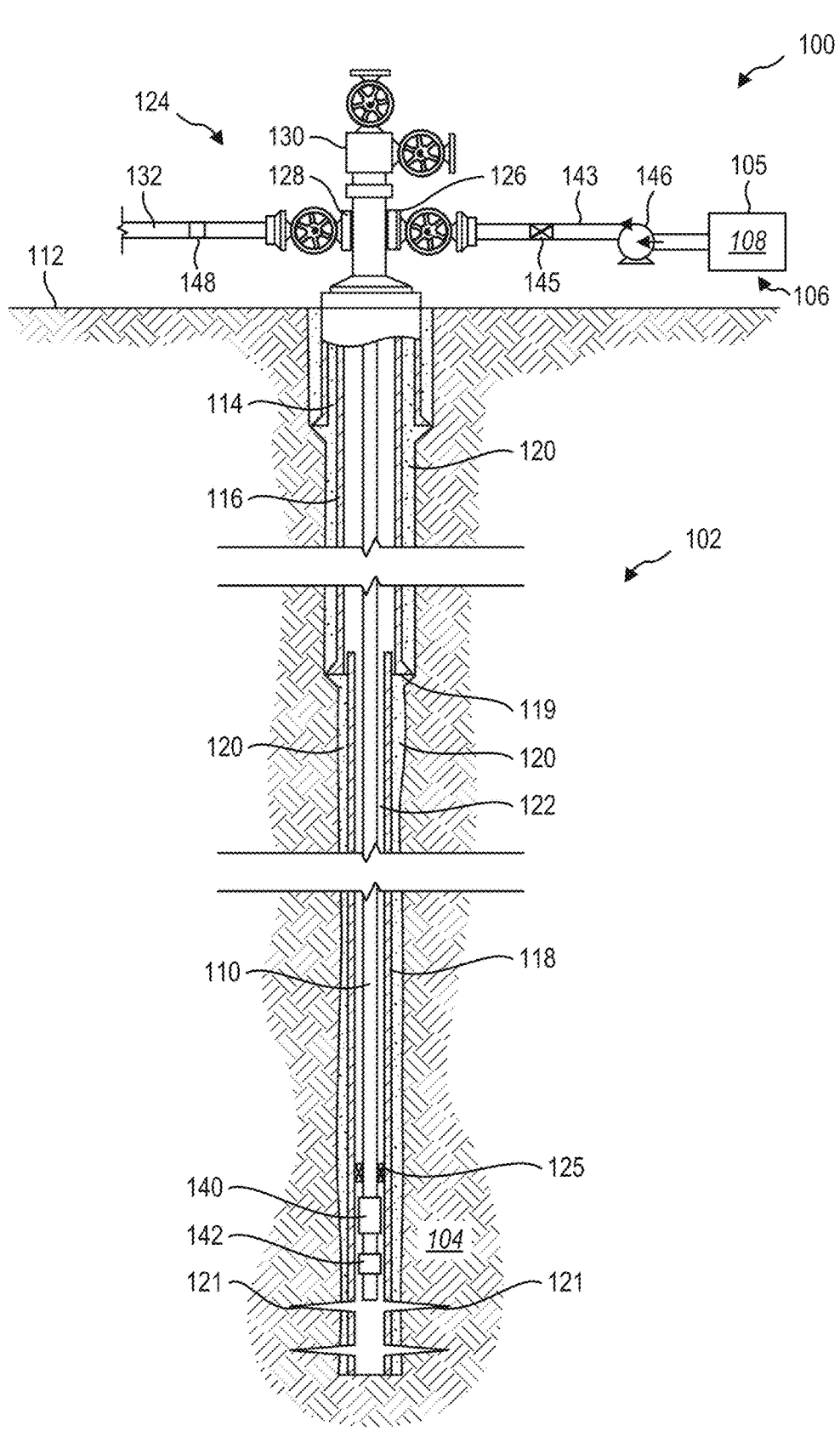
FIG. 1 is a simplified schematic of a wellbore system including a wellbore extending through an earth formation and a wellbore additive application system, according to at least one embodiment of the disclosure.

This disclosure generally relates to wellbore additives for treating a wellbore and/or a wellbore fluid for facilitating one or more wellbore operations. The wellbore additives may also be referred to herein as "treatment additives" or "treatment fluids." The wellbore additives may include, for example, scavenger materials for sulfur-containing materials and/or biocides for treating a wellbore, a wellbore fluid (e.g., a produced fluid), and/or the earth formation. For example, the disclosure relates to scavenger materials for sulfur-containing materials and to related methods of treating a wellbore or a wellbore fluid (e.g., a produced fluid) for one or more sulfur-containing materials. In some embodiments, a wellbore additive includes a biocide configured to treat a wellbore and/or a wellbore fluid for microorganisms or other biomaterials, such as bacteria, algae, or other organisms. As used herein, a wellbore additive may include a scavenger material and/or a biocide. In some embodiments, the scavenger material and the biocide comprise the same material. In other words, in some such embodiments, the wellbore additive comprises a material that functions as a scavenger material and a biocide. In some such embodiments, the wellbore additive may be referred to as a scavenger material when applied for scavenging purposes and may be referred to as a biocide when applied as a biocide; or may simply be referred to herein as a "wellbore additive."

The wellbore additive may be formed in-situ in the wellbore from a precursor wellbore additive. The precursor wellbore additive may simply be referred to herein as a "precursor additive." In addition, the precursor wellbore additive may be referred to as a "precursor scavenger" or a "precursor scavenger material" in embodiments where the precursor wellbore additive forms a scavenger material in-situ and/or is applied to the wellbore and/or wellbore fluid as a scavenger material; and may be referred to as a "precursor biocide" or a "precursor biocide material" where the precursor wellbore additive forms a biocide in-situ and/or is applied to the wellbore and/or wellbore fluid as a biocide. The precursor wellbore additive (e.g., a precursor scavenger material, a biocide precursor) may be formulated and configured to form the wellbore additive (e.g., a scavenger material, a biocide material) in-situ in a wellbore or an earth formation through which the wellbore extends. In some embodiments, the precursor wellbore additive (e.g., the precursor scavenger material, the biocide precursor) is formulated and configured to hydrolyze when exposed to wellbore conditions to form the wellbore additive (e.g., the scavenger material, the biocide) downhole (e.g., in the wellbore or in the earth formation). In other embodiments, the precursor wellbore additive (e.g., the precursor scavenger material, the biocide precursor) is formulated and configured to dehydrate (e.g., release water) when exposed to the wellbore conditions to form the wellbore additive (e.g., the scavenger material, the biocide).

In some embodiments, the precursor wellbore additive is formulated and configured to form a scavenger material in-situ. The in-situ formed scavenger material may be formulated and configured to scavenge (e.g., remove, react with to form another material) sulfur-containing species, such as hydrogen sulfide or mercaptans, in the earth formation and/or the wellbore extending through the earth formation. The scavenger material may be more reactive with sulfur-containing materials than the precursor scavenger material. In other words, the scavenger material formed in-situ downhole may be more effective at reacting with sulfur-containing materials (e.g., hydrogen sulfide, mercaptans) than the precursor scavenger material.

In some embodiments, the precursor wellbore additive is formulated and configured to form a biocide in-situ. The in-situ formed biocide may be formulated and configured to control microbial activity (e.g., the formation of biofilms) in a wellbore and/or a wellbore fluid. The in-situ formed biocide may reduce a concentration of microorganisms in the wellbore and/or may treat the wellbore, wellbore fluid, and/or earth formation for the effects of microorganism metabolism (such as for acids, gases, biofilm, scale, and/or corrosion).

In some embodiments, the precursor wellbore additive is formulated and configured to react to form the wellbore additive responsive to exposure to acidic conditions, such as a pH less than about 6.5 or less than about 6.0. In some embodiments, the precursor wellbore additive is formulated and configured to form the wellbore additive responsive to exposure to an acid (e.g., a Bronsted acid, such as carbonic acid; a Lewis acid, such as metal ions) within the wellbore and/or responsive to exposure to water in the wellbore.

The precursor wellbore additive may be easier to handle, may pose fewer health risks, and may be more environmentally friendly than the wellbore additive that is formed downhole. The precursor wellbore additive may not be as reactive in ambient conditions prior to introducing the precursor wellbore additive to the wellbore as the in-situ formed wellbore additive. Since the precursor wellbore additive does not react when exposed to ambient conditions, the precursor wellbore additive may be used to form more reactive wellbore additives (e.g., scavenger materials, biocides) while reducing health hazards and personnel exposure since the wellbore additives are not formed until the precursor wellbore additive is downhole. Accordingly, the precursor wellbore additive may facilitate using scavenger materials and/or biocides that have heretofore not been used or that pose significant risks due to their reactivity or other properties.

FIG. 1 is a simplified schematic of a wellbore system 100 including a wellbore 102 extending through an earth formation 104, according to at least one embodiment of the disclosure. The wellbore system 100 includes a wellbore additive application system 106 (also referred to as a "precursor wellbore additive application system") configured to provide a precursor wellbore additive 108 to one or more portions of the wellbore system 100, for example, based on a concentration of one or more sulfur-containing species and/or a concentration of one or more microorganisms in wellbore 102 and/or the earth formation 104. In some embodiments, the wellbore additive application system 106 is configured to facilitate provision of the precursor wellbore additive 108 for application as a sulfur scavenger (e.g., a sulfur hydroxide scavenger, a mercaptan scavenger) and the wellbore additive application system 106 may be referred to as a "sulfur-containing scavenger material application system." In some embodiments, the wellbore additive application system 106 is configured to facilitate provision of the precursor wellbore additive 108 for application as a biocide, and the wellbore additive application system 106 may be referred to as a "biocide application system." In some embodiments, the scavenger and the biocide may comprise the same material; and the precursor wellbore additive 108 for the scavenger and the biocide is the same material. As described herein, the wellbore additive application system 106 may be configured to provide the precursor wellbore additive 108 to a downhole location, such as to the wellbore 102 and/or the earth formation 104. The precursor wellbore additive 108 may be formulated and configured to react downhole (e.g., within the wellbore 102, within the earth formation 104) to form a wellbore additive, which may be a biocide and/or a sulfur scavenger (also referred to as a "sulfur-containing species scavenger," a "hydrogen sulfide scavenger," a "scavenger," or an "in-situ formed scavenger") configured to react with a respective biomaterial and/or sulfur-containing species in the wellbore 102 and/or the earth formation 104 to reduce a concentration of the respective biomaterial and/or sulfur-containing species in the wellbore 102, a wellbore fluid, or the earth formation 104.

The wellbore 102 may extend through one or more reservoirs (e.g., hydrocarbon-containing reservoirs, water reservoirs) located within the earth formation 104. For example, the wellbore 102 may extend through one or more hydrocarbon-containing zones of the earth formation 104. As illustrated in FIG. 1, the wellbore 102 may be completed with a series of pipe strings extending through the earth formation 104, which may be referred to as a casing or a liner. The liners may include, for example, a surface casing 114, an intermediate casing 116, and a production casing 118 (also referred to as a "production string" or "production liner"). The wellbore 102 may further include a conductor casing located above (e.g., closer to the surface 112) the surface casing 114. Each of the conductor casing, the surface casing 114, the intermediate casing 116, and the production casing 118 may be secured to sidewalls of the earth formation 104 defining the wellbore 102 with cement 120. Production tubing 110 may extend within the production casing 118 and may be configured to provide one or more chemicals (e.g., precursor wellbore additive 108) to the wellbore 102. The production tubing 110 may further be configured to provide one or more produced fluids to a surface 112. The production tubing 110 and the production casing 118 may define an annulus 122 (also referred to as an "annular region") between outer surfaces of the production tubing 110 and inner surfaces of the production casing 118 through which one or more fluids (e.g., wellbore fluids, produced fluids) may flow to and/or from the surface 112.

The production casing 118 may be hung from the intermediate casing 116 with a liner hanger 119. The production casing 118 may extend into the earth formation 104 more than the production tubing 110. In some embodiments, the production casing 118 is perforated. Perforations 121 may be in fluid communication with the earth formation 104 and may be configured to facilitate the flow of fluid (e.g., produced fluids) from the earth formation 104 through the perforations 121 to the inner diameter of the production casing 118. A production packer 125 may be disposed between the production tubing 110 and the production casing 118. The production packer 125 may be configured to seal the annulus 122 between the production tubing 110 and the production casing 118.

The wellbore system 100 may include a wellhead 124 located above the surface 112. The wellhead 124 may include a so-called "Christmas tree" including piping and connections (e.g., valves) for operating the wellbore system 100. The wellhead 124 may be configured to facilitate the flow of fluids (e.g., wellbore fluids, produced fluids, stimulation fluids, fracturing fluids) to and from the wellbore 102. For example, the wellhead 124 may include a first valve 126, a second valve 128, and a third valve 130. Each of the first valve 126, the second valve 128, the third valve 130 may be sealed and in fluid communication with one or more of the surface casing 114, the intermediate casing 116, the production casing 118, and/or the production tubing 110. Accordingly, the production tubing 110 and the production casing 118 are in fluid communication with the wellhead 124. For example, one or more fluids may flow to and/or from the wellbore 102 through the production tubing 110 and/or through the annulus 122 between the production tubing 110 and the production casing 118. In some embodiments, the production tubing 110 is configured to provide produced fluids (e.g., hydrocarbons (e.g., oil, gas), water, brine) to piping 132 in fluid communication with one of the valves, such as the second valve 128. At least one of the valves, such as the third valve 130, may be in fluid communication with one or more fluids that may be provided to the wellbore 102, such as one or more wellbore fluids, stimulation fluids, fracturing fluids, treatment fluids, or other fluids formulated and configured to facilitate one or more wellbore operations.

In some embodiments, the wellbore system 100 further includes an electric submersible pump 140 configured to provide one or more chemicals to the wellbore 102 and/or to facilitate the flow of produced fluids to surface piping. For example, the electric submersible pump 140 may be configured to provide the precursor wellbore additive 108 to the wellbore 102, such as through the wellhead 124 and through one or both of the production tubing 110 and the production casing 118.

In some embodiments, one or more sensors 142 may be located within the wellbore 102 and configured to measure one or more properties or conditions within the wellbore 102. In some embodiments, the sensor 142 is configured to measure a concentration of at least one of one or more sulfur-containing species in the wellbore 102, a microorganism concentration in the wellbore 102, a concentration of the wellbore additive formed in-situ, a concentration of the precursor wellbore additive 108, or a concentration of one or more byproducts of microorganism metabolism processes (e.g., a concentration of one or more acids, acids gases (e.g., hydrogen sulfide), scale, or biofilm (e.g., slime)). The concentrations measured by the one or more sensors 142 may be of a fluid proximate the production tubing 110, the production casing 118, and/or proximate wellbore equipment. In some embodiments, the sensor 142 is configured to measure a concentration of hydrogen sulfide and mercaptans. In some embodiments, the sensor 142 comprises an inline hydrogen sulfide sensor. In some embodiments, the sensor 142 comprises a microorganism sensor or other sensor configured to measure a concentration of microorganisms in the wellbore 102. In some embodiments, the sensor 142 is configured to measure the concentration of the precursor wellbore additive 108. The sensor 142 may be configured to measure the concentration of the sulfur-containing material and/or of microorganisms in a fluid, which may be a liquid, a gas, or a combination thereof. In some embodiments, the one or more sensors 142 are configured to measure a concentration of the precursor wellbore additive 108.

With continued reference to FIG. 1, the precursor wellbore additive 108 may be in fluid communication with the wellbore 102, such as through piping 143 in fluid communication with the tank 105 including the precursor wellbore additive 108. A valve 145 and a pump 146 may be configured to control a flowrate of the precursor wellbore additive 108 from the tank 105 to the wellbore 102, such as through the first valve 126 and the wellhead 124 to the annulus 122 and/or the production tubing 110. In some embodiments, the wellbore system 100 includes coiled tubing, such as within the production tubing 110, for providing the precursor wellbore additive 108 to the wellbore 102.

In some embodiments, the wellbore system 100 further includes a sensor 148 configured to measure a concentration of at least one of one or more microorganisms and/or sulfur-containing species in the wellbore 102, a concentration of the wellbore additive, a concentration of the precursor wellbore additive 108, or a concentration of a byproduct of microorganism metabolism processes in a produced fluid. The sensor 148 may be located above the surface 112, for example, such as in the piping 132 in fluid communication with the second valve 128. In some embodiments, the sensor 148 is configured to measure a concentration of one or more sulfur-containing species in the produced fluid, which may facilitate determining whether to increase or decrease a flowrate of the precursor wellbore additive 108. In some embodiments, the sensor 148 is configured to measure a concentration of microorganisms in the produced fluid, which may facilitate determining whether to increase or decrease a flowrate of the precursor wellbore additive 108. For example, responsive to determining that a concentration of the sulfur-containing species and/or the microorganism concentration in the produced fluid is greater than a predetermined threshold concentration, the wellbore additive application system 106 may cause a flowrate of the precursor wellbore additive 108 to be increased; and responsive to determining that the concentration of the sulfur-containing species and/or the microorganism concentration in the produced fluid is less than the predetermined threshold concentration, the wellbore additive application system 106 may cause a flowrate of the precursor wellbore additive 108 to be decreased.

A flowrate of the precursor wellbore additive 108 to be provided to the wellbore 102 may be determined based, at least in part, on sensor data from the sensor 142 and/or the sensor 148, which may correspond to a concentration of sulfur-containing materials and/or microorganism concentration in the wellbore 102, proximate wellbore equipment, and/or within the earth formation 104. For example, the flowrate and/or concentration of the precursor wellbore additive 108 may be determined based on the concentration of the sulfur-containing species and/or microorganisms measured by the sensor 142; and/or by the concentration of the sulfur-containing species and/or microorganisms in the produced fluid measured by the sensor 148.

The precursor wellbore additive 108 may include one or more materials formulated and configured to react downhole (e.g., within the wellbore 102, within the earth formation 104) to form the wellbore additive in-situ. In some embodiments, the wellbore additive comprises a scavenger material and is formulated and configured to react with one or more sulfur-containing species downhole to scavenge (e.g., capture, bind) the sulfur-containing species. In other words, the scavenger material may be configured to reduce a concentration of the sulfur-containing species. The sulfur-containing species may include hydrogen sulfide, mercaptans (e.g., having the formula R—SH, wherein R is a methyl group, an ethyl group, a propyl group, a butyl group), or a combination thereof. Mercaptans may include, for example, one or more of methanethiol ($CH_3SH$), ethanethiol ($C_2H_5SH$), propane-1-thiol ($C_3H_7SH$), butanethiol ($C_4H_9SH$), benzyl mercaptan ($C_6H_5CH_2SH$), thiophenol ($C_6H_5SH$), or another thiol. In some embodiments, the wellbore additive comprises a biocide and is formulated and configured to reduce a concentration of microorganisms (e.g., bacteria, fungi, algae) in the wellbore 102 and/or the earth formation 104, disrupt biofilms and/or reduce the formation of biofilms, or may otherwise reduce the effect of biomaterials in the wellbore 102 and/or the earth formation 104. In some embodiments, the biocide comprises a material formulated and configured to reduce a concentration or an effect of one or more byproducts of microorganism metabolism processes, such as acids, acid gases, scale, and/or biofilm.

In some embodiments, the precursor wellbore additive 108 is formulated and configured to form the wellbore additive responsive to exposure to one or more acids or acidic conditions downhole. In some embodiments, responsive to exposure to a pH lower than about 6.5, such as lower than about 6.0, the precursor wellbore additive 108 may hydrolyze to form the active wellbore additive (e.g. an active scavenger material, an active biocide). In some embodiments, responsive to exposure to an acid, such as carbonic acid, the precursor wellbore additive 108 may be formulated and configured to form the wellbore additive in-situ. In some embodiments, responsive to exposure to water, the precursor wellbore additive 108 may be formulated and configured to form the wellbore additive.

The precursor wellbore additive 108 may include an acetal having the general formula $R_1CH(OR_2)(OR_3)_2$, wherein $R_1$ is an organic group or hydrogen, and each of $R_2$ and $R_3$ are individually an organic group. In some embodiments, the acetal is linear or branched. In some embodiments, the acetal is cyclic wherein the acetal carbon atom is part of a ring structure. In some embodiments, the precursor wellbore additive 108 comprises a hydroxy carbonyl compound. In some embodiments, the precursor wellbore additive 108 comprises a hydroxyaldehyde (e.g., having the general formula $R$—$CH(OH)$—$CHO$, wherein R is an alkyl group or hydrogen). In some embodiments, the precursor wellbore additive 108 comprises an aldol comprising a structure including a hydroxy group (—OH) two carbons away from an aldehyde or a ketone carbon atom. In some embodiments, the hydroxy carbonyl compound comprises 3-hydroxypropanal. The precursor wellbore additive 108 may be formulated and configured to react in-situ downhole to form an unsaturated aldehyde.

In some embodiments, the precursor wellbore additive 108 comprises an acetal. The precursor wellbore additive 108 may include a reaction product of propenal (also known as acrolein) and at least one alcohol. In some embodiments, the precursor wellbore additive 108 includes a reaction product of propenal and a diol. In some embodiments, the precursor wellbore additive 108 includes a reaction product of propenal and an alcohol and comprises an acetal. The acetal may have the general formula $R_1CH(OR_2)(OR_3)_2$, wherein $R_1$ is an organic group or hydrogen, and each of $R_2$ and $R_3$ are an organic group. The composition of $R_2$ and $R_3$ may depend on the alcohol(s) used to form the precursor wellbore additive 108. Accordingly, each of $R_2$ and $R_3$ may be the same, or $R_2$ and $R_3$ may be different, and may depend on the alcohol used to form the precursor wellbore additive 108. For example, where the precursor wellbore additive 108 is formed from a single alcohol (e.g., a high purity alcohol, an alcohol including one composition), each of $R_2$ and $R_3$ may be the same. In embodiments where the precursor wellbore additive 108 is formed from an alcohol mixture including more than one alcohol, each of the R' groups may be different.

Figure 2A:
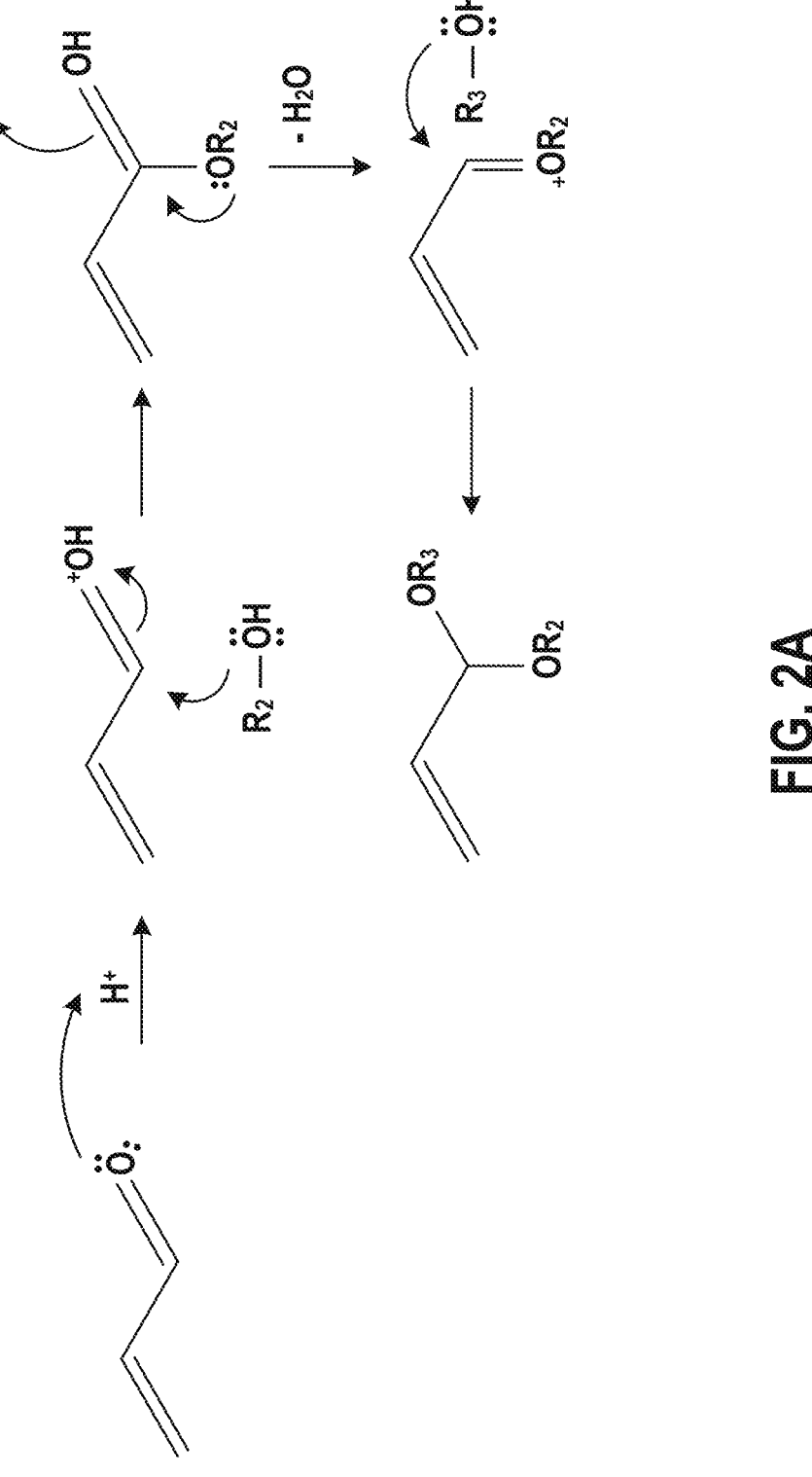
FIG. 2A is a simplified schematic illustrating a reaction scheme for forming a precursor wellbore additive from propenal and an alcohol, according to at least one embodiment of the disclosure.

In some embodiments, the precursor wellbore additive 108 is formed by reacting each molecule of propenal with two molecules of an alcohol. The molecules of the alcohol may be the same or may be different. FIG. 2A is a simplified schematic illustrating a reaction scheme for forming the precursor wellbore additive 108 from propenal and an alcohol, according to at least one embodiment of the disclosure. With reference to FIG. 2A, propenal may react with a first alcohol molecule ($R_2$—OH) under acidic conditions. Hydrogen ions may protonate the aldehyde carbonyl, increasing the electrophilicity thereof. The protonation of the aldehyde carbonyl may enhance the reactivity of the aldehyde towards nucleophilic addition by an alcohol to form a hemiacetal intermediate. The hemiacetal intermediate may be protonated at the hydroxyl group to form water by dehydration of the hemiacetal and an electrophilic oxonium group that may react with a second alcohol ($R_3$—OH) to yield the acetal precursor wellbore additive 108. The precursor wellbore additive 108 may include an acetal having the formula $CH_2CHCH(OR_2)(OR_3)$. In some embodiments, the precursor wellbore additive 108 includes an acetal material including an R group including a terminal unsaturated bond (a terminal carbon to carbon double bond), as shown in FIG. 2A.

With continued reference to FIG. 2A, each of $R_2$ and $R_3$ may individually include a $C_1$ to $C_{20}$ carbon group. The $C_1$ to $C_{20}$ carbon groups may individually be linear or branched. In addition, the $C_1$ to $C_{20}$ carbon groups may individually be saturated or may be unsaturated (e.g., include one or more unsaturated bonds, such as monounsaturated, di-unsaturated, tri-unsaturated, etc.). In some embodiments, each of $R_2$ and $R_3$ are the same. In other embodiments, $R_2$ and $R_3$ are different. For example, each of $R_2$ and $R_3$ may individually include a methyl group (—$CH_3$), an ethyl group (—$CH_2CH_3$), a propyl group (—$CH_2(CH_3)_2$), a butyl group (—$CH_2$ ($CH_3)_3$), a pentyl group (—$CH_2(CH_3)_4$), a hexyl group, a heptyl group, an octyl group, a nonyl group, a decyl group, or another group.

Figure 2B:
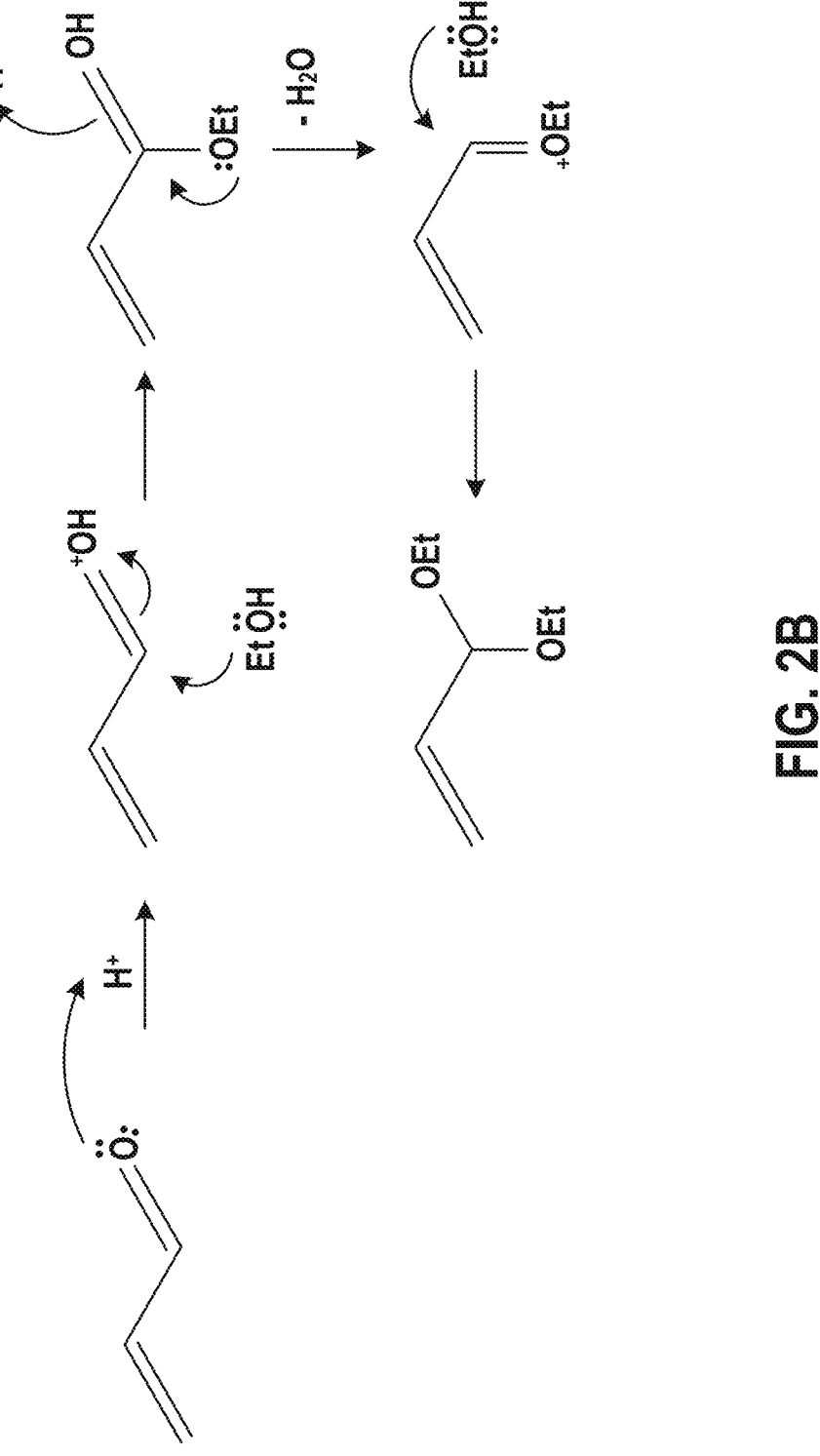
FIG. 2B is a simplified schematic illustrating a reaction scheme for forming the precursor wellbore additive from propenal and ethanol, according to at least one embodiment of the disclosure.

In some embodiments, each of $R_2$ and $R_3$ are the same. FIG. 2B is a simplified schematic illustrating a reaction scheme for forming the precursor wellbore additive 108 from propenal and ethanol, according to at least one embodiment of the disclosure. In particular, in FIG. 2B, each of $R_2$ and $R_3$ from FIG. 2A are ethyl groups (—$CH_2CH_3$, represented as "Et" in FIG. 2B). The resulting acetal is acrolein diethyl acetal. Accordingly, in some embodiments, the precursor wellbore additive 108 comprises acrolein diethyl acetal.

Figure 2C:
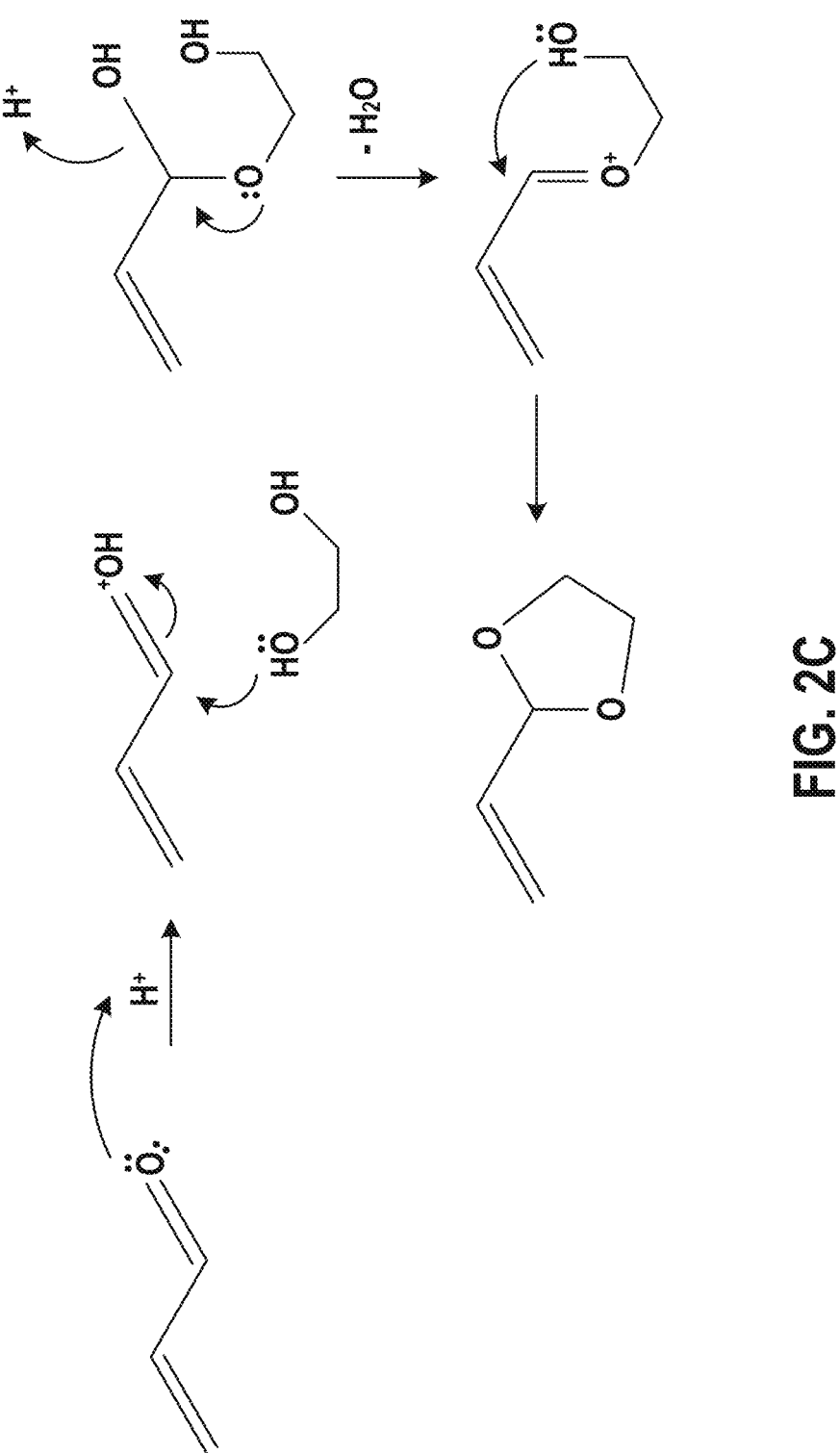
FIG. 2C is a simplified schematic illustrating a reaction scheme for forming the precursor wellbore additive from propenal and a diol, according to at least one embodiment of the disclosure.

FIG. 2C is a simplified schematic illustrating a reaction scheme for forming the precursor wellbore additive 108 from propenal and a diol, according to at least one embodiment of the disclosure. With reference to FIG. 2C, the diol may include ethylene glycol ($HOCH_2CH_2OH$). With reference to FIG. 2C, the carbonyl of the propenal may be protonated, followed by nucleophilic addition of the ethylene glycol to form a hemiacetal intermediate. The hemiacetal intermediate may be protonated at the hydroxyl group to form water by dehydration, as described with reference to FIG. 2A. The resulting structure may react with the second hydroxyl group of the diol to form a cyclic acetal. Accordingly, in some embodiments, the precursor wellbore additive 108 comprises a cyclic acetal. In some embodiments, the precursor wellbore additive 108 comprises a cyclic acetal including a 5-membered ring, where 2 of the members of the 5-member ring are oxygen atoms of the cyclic acetal. In some embodiments, the precursor wellbore additive 108 comprises 2-vinyl-1,3-dioxolane, which is also referred to as acrolein ethylene glycol acetal or acrolein ethylene acetal.

After the precursor wellbore additive 108 is introduced into the wellbore 102, the precursor wellbore additive 108 may react downhole (e.g., in the wellbore 102, in the production tubing 110, in the production casing 118, in the earth formation 104) to form a wellbore additive formulated and configured to react with sulfur-containing species, such as hydrogen sulfide and/or mercaptans, to react with biomaterials (e.g., microorganisms), and/or to react with byproducts of microorganisms. For example, when the precursor wellbore additive 108 comprises an acetal (as described with reference to FIG. 2A through FIG. 2C). The precursor wellbore additive 108 may hydrolyze in the presence of an acid (whether a Bronsted acid or a Lewis acid) and/or responsive to exposure to a pH lower than about 6.5, such as lower than about 6.0, to form propenal. In some embodiments, the precursor wellbore additive 108 is exposed to an acid and water downhole to form the wellbore additive. By way of non-limiting example, the precursor wellbore additive 108 may be exposed to carbonic acid and water downhole. Responsive to such exposure, the precursor wellbore additive 108 may react to form propenal and two alcohols (corresponding to $R_2$ and $R_3$ described above). In some embodiments, the formation of the wellbore additive downhole proceeds in the opposite direction as that described above with reference to FIG. 2A through FIG. 2C.

Figures 2D, 2E:
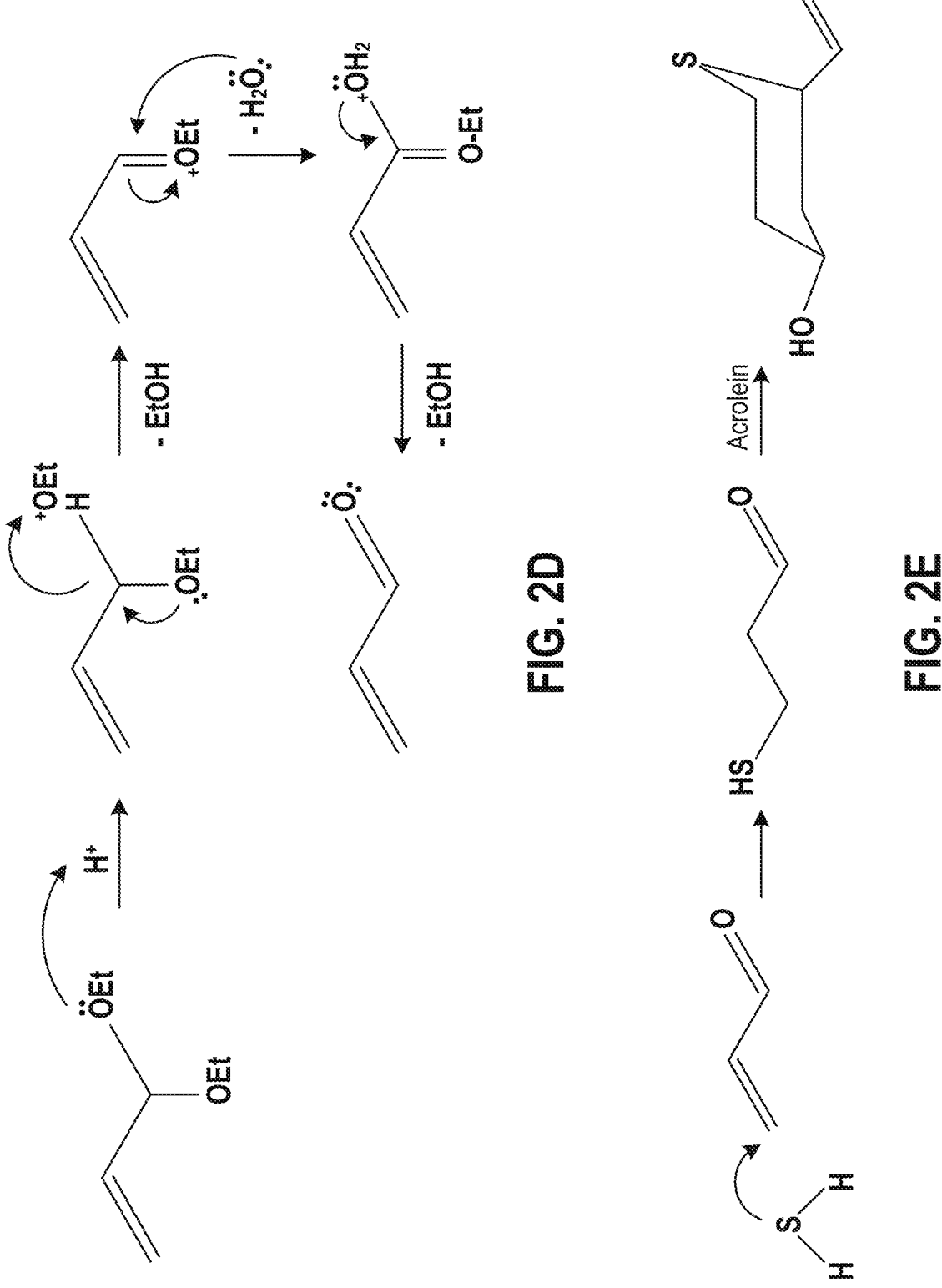
FIG. 2D is a simplified schematic illustrating a reaction scheme for forming propenal in-situ downhole from acrolein diethyl acetal, according to at least one embodiment of the disclosure.
FIG. 2E is a simplified schematic of a reaction scheme for reaction between propenal and hydrogen sulfide, which may occur within the wellbore, in accordance with at least one embodiment of the disclosure.

FIG. 2D is a simplified schematic illustrating a reaction scheme for forming propenal in-situ downhole from acrolein diethyl acetal, according to at least one embodiment of the disclosure. With reference to FIG. 2D, the acrolein diethyl acetal may be protonated in the presence of an acid. Responsive to protonation, an ethanol group may be removed to form an intermediate structure including a carbon to carbon double bond and an oxonium cation, which water may react with, resulting in hydrolysis and the formation of propenal and the liberation of ethanol.

After forming the propenal in-situ, the propenal may react with sulfur-containing species and/or microorganisms in the wellbore 102, such as in wellbore fluids and/or produced fluids. FIG. 2E is a simplified schematic of a reaction scheme for reaction between propenal and hydrogen sulfide, which may occur within the wellbore 102. With reference to FIG. 2E, the weak nucleophile of the hydrogen sulfide may attack the β carbon atom (the terminal carbon atom of the carbon to carbon double bond). The resulting structure reacts with another propenal molecule to form a compound in which the sulfur from the hydrogen sulfide is bound in a ring structure. Accordingly, the propenal may scavenge the hydrogen sulfide and other sulfur-containing species.

While the precursor wellbore additive 108 has been described and illustrated as including an acetal, the disclosure is not so limited. In some embodiments, the precursor wellbore additive 108 comprises a hydroxy carbonyl compound, such as a β-hydroxyl carbonyl compound. In some embodiments, the precursor wellbore additive 108 comprises a reaction product of an Aldol reaction, wherein two carbonyl compounds (e.g., aldehydes and ketones) combine (react) to form a new β-hydroxy carbonyl compound. In some embodiments, the precursor wellbore additive 108 comprises an aldol comprising a structure including a hydroxy group (—OH) two carbons away from an aldehyde or a ketone.

In some embodiments, the precursor wellbore additive 108 comprises a reaction product of an aldehyde and a ketone. In some embodiments, the precursor wellbore additive 108 comprises a reaction product of two aldehydes (e.g., a first aldehyde and a second aldehyde). The aldehyde may include one or more of formaldehyde (methanal), acetaldehyde (ethanal), propionaldehyde (propanal), butyraldehyde (butanal), isovaleraldehyde, or another aldehyde. By way of non-limiting example, one of the carbon compounds may be capable of being enolized and another of the carbonyl compounds may not be capable of being enolized. In some embodiments, the aldehyde and the ketone react in a crossed aldol reaction to form the precursor wellbore additive 108, which may comprise a reaction product of an aldehyde and a ketone, or a reaction product of a first aldehyde and a second aldehyde.

Figure 3A:
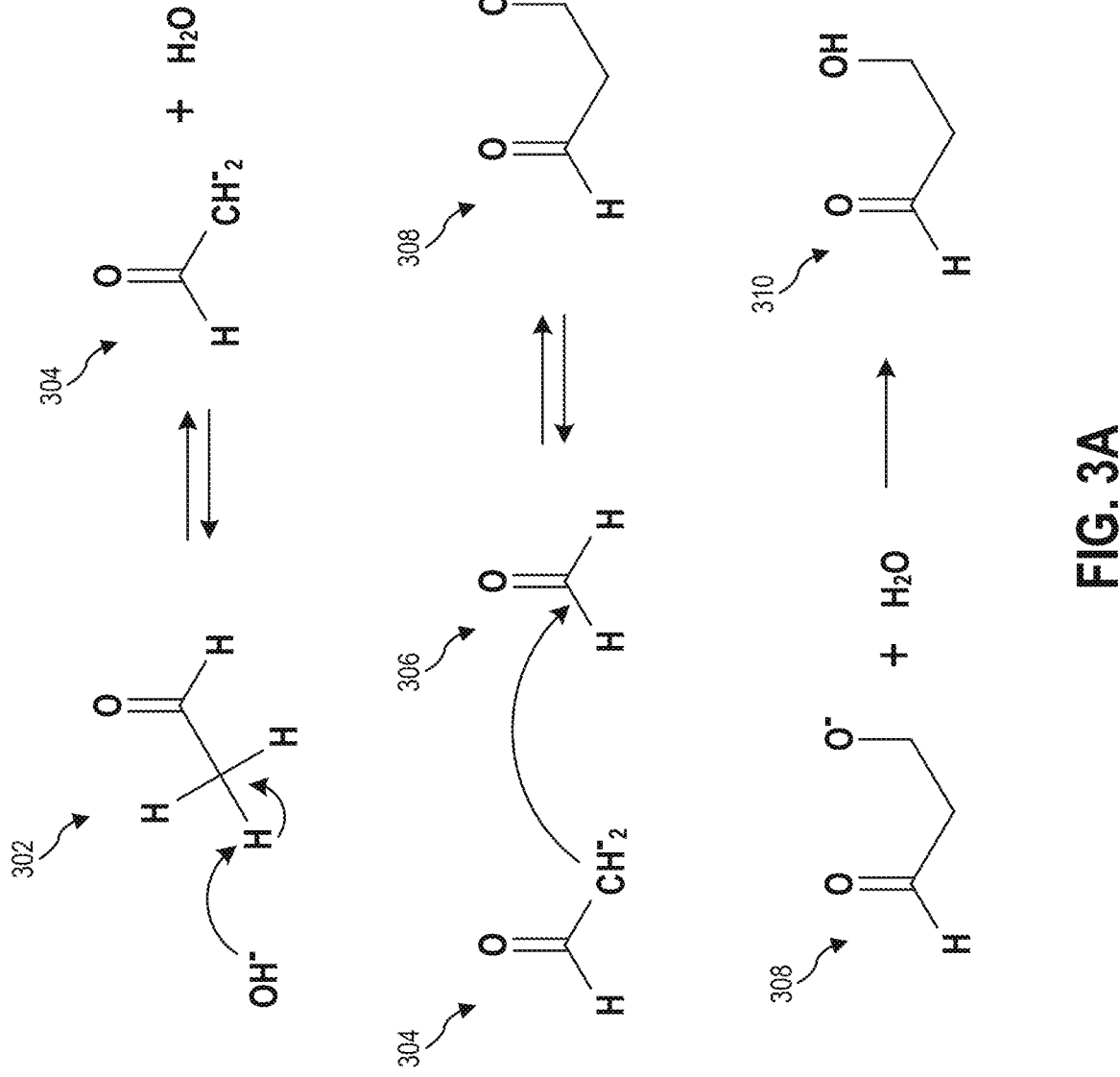
FIG. 3A is a simplified schematic illustrating a reaction scheme for forming a precursor wellbore additive from formaldehyde and acetaldehyde to form 3-hydroxypropanal, according to at least one embodiment of the disclosure.

In some embodiments, at least one of the aldehydes comprises acetaldehyde. In some embodiments, at least one of the aldehydes comprises formaldehyde. In some embodiments, the aldehydes include formaldehyde and acetaldehyde and the reaction product includes 3-hydroxypropanal. FIG. 3A is a simplified schematic illustrating a reaction scheme for forming the precursor wellbore additive 108 from formaldehyde and acetaldehyde in an Aldol reaction to form 3-hydroxypropanal, according to at least one embodiment of the disclosure. The formaldehyde may react with the acetaldehyde to form the precursor wellbore additive 108 comprising 3-hydroxypropanal.

For example, with reference to FIG. 3A, responsive to exposure to hydroxide ions, acetaldehyde 302 may form an enolate ion 304 and water. The enolate ion 304 may react with formaldehyde 306 to form an alkoxide ion 308. The alkoxide ion may react with water to form 3-hydroxypropanal 310.

In some embodiments, the precursor wellbore additive 108 comprises a hydroxyl carbonyl compound. In some embodiments, the hydroxyl carbonyl compound includes a terminal carbonyl group at a first terminal portion of the hydroxyl carbonyl compound, and a terminal hydroxyl group at a second terminal portion of the hydroxyl carbonyl compound. The hydroxyl carbonyl compound may include a hydroxyaldehyde having the general formula R—CH(OH)—CHO, wherein R is an alkyl group or hydrogen. The hydroxyl carbonyl compound may include one or more of 3-hydroxypropanal, 4-hydroxybutanal, 5-hydroxypentanal, 6-hydroxyhexanal, 7-hydroxyheptanal, 8-hydroxyloctanal, 9-hydroxynonanal, or 10-hydroxydecanal. In some embodiments, the hydroxyl carbonyl compound comprises 3-hydroxypropanal.

The precursor wellbore additive 108 may react downhole in-situ to form the wellbore additive (e.g., the scavenger material, the biocide) after introduction of the precursor wellbore additive 108 into the wellbore 102. In some embodiments, the wellbore additive is formulated and configured to act as a biocide. In some embodiments, the biocide reduces and/or prevents biological reactions within the wellbore 102 and/or the earth formation 104 and/or reacts with and/or interacts with one or more byproducts of microorganisms. In some embodiments, the biocide interacts with microorganisms in the wellbore 102 and/or the earth formation 104, reducing and/or preventing microbial activity. The biocide may be formulated and configured to prevent and/or reduce microbial-induced corrosion (e.g., by reducing sulfate-reducing bacteria, which produce hydrogen sulfide), control biofilm formation, reduce reservoir souring, and reduce microbial growth on tubing, casings, liners, and other wellbore equipment. For example, biomaterials present in the wellbore may cause several problems including, for example, formation face damage, biofouling, iron sulfide scaling, hydrogen sulfide generation, emulsification, and microbiologically induced corrosion. Without being bound by any particular theory, in some embodiments, the biocide is formulated and configured to bind to proteins and disable cell mechanisms of microorganisms within the wellbore 102 and/or the earth formation 104, oxidize microorganisms (e.g., cell walls, DNA, and other molecules), and/or damage or rupture cell membranes of microorganisms. In some embodiments, the biocide is formulated and configured to denature proteins of the microorganisms. In some embodiments, the biocide reacts with sulfhydryl groups of the microorganisms and may also attack primary and secondary amines in proteins of nucleic acids of the microorganisms. Such reactions may affect enzyme systems and structural proteins of the microorganisms. In some embodiments, the wellbore additive comprises a scavenger material formulated and configured to react with sulfur-containing species, such as hydrogen sulfide and/or mercaptans. For example, when the precursor wellbore additive 108 comprises a hydroxyl carbonyl compound (e.g., as described with reference to FIG. 3A), the precursor wellbore additive 108 may react responsive to exposure to an acid or acidic conditions to form a wellbore additive comprising an unsaturated aldehyde. The acidic conditions may include a pH lower than about 6.5, such as lower than about 6.0. In some embodiments, the precursor wellbore additive 108 is exposed to an acid and water downhole to form the wellbore additive. By way of non-limiting example, the precursor wellbore additive 108 may be exposed to carbonic acid and water downhole. Responsive to exposure to such conditions, the precursor wellbore additive 108 may react to form the wellbore additive comprising the unsaturated aldehyde and water.

Figure 3B:
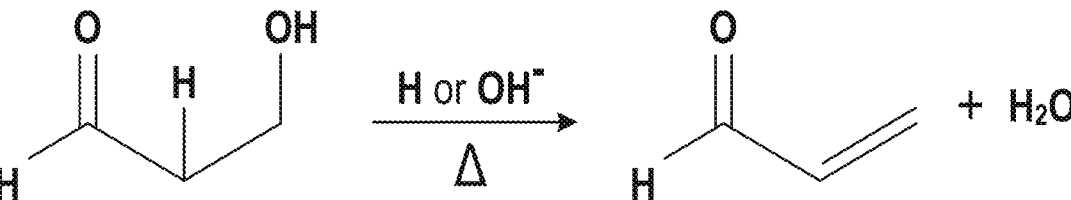
FIG. 3B is a simplified schematic illustrating a reaction scheme for forming acrolein from the 3-hydroxypropanal, according to at least one embodiment of the disclosure.

FIG. 3B is a simplified schematic illustrating a reaction scheme for forming propenal from the 3-hydroxypropanal, according to at least one embodiment of the disclosure. In some embodiments, responsive to exposure to acidic conditions and/or basic conditions, the 3-hydroxypropanal may be dehydrated to form the propenal and water.

Accordingly, the precursor wellbore additive 108 may include one or more of an acetal having the general formula $R_1CH(OR_2)(OR_3)_2$, wherein $R_1$ is an organic group or hydrogen, and each of $R_2$ and $R_3$ are an organic group; a linear acetal, an acetal including a ring structure; a hydroxy carbonyl compound; a hydroxyaldehyde; or a reaction product of at least one of an aldehyde or a ketone and at least another of an aldehyde or a ketone (e.g., a reaction product of two aldehydes). In some embodiments, the precursor wellbore additive 108 includes more than one compound. For example, the precursor wellbore additive 108 may include a first type of acetal and a second type of acetal. In some embodiments, the precursor wellbore additive 108 includes at least one type of acetal and at least one hydroxy-aldehyde. In some embodiments, the precursor wellbore additive 108 comprises acrolein diethyl acetal and acrolein ethylene glycol acetal. In some embodiments, the precursor wellbore additive 108 comprises 3-hydroxypropanal and an acetal, such as one or both of acrolein diethyl acetal and acrolein ethylene glycol acetal.

As described above, the precursor wellbore additive 108 may be formulated and configured to react responsive to exposure to one or more conditions within the wellbore 102 to form the scavenger material. The one or more conditions within the wellbore 102 may include exposure to an acid and/or a pH lower than about 6.5, such as lower than about 6.0. The acid may include, for example, carbonic acid. In some embodiments, the precursor wellbore additive 108 is formulated and configured to form a scavenger material comprising propenal in-situ responsive to exposure to the one or more conditions within the wellbore 102.

In embodiments where the precursor wellbore additive 108 comprises an acetal, the precursor wellbore additive 108 may react in-situ to form the wellbore additive. The in-situ formed scavenger material may comprise an unsaturated aldehyde. In some embodiments, the wellbore additive (e.g., the scavenger, the biocide) comprises propenal.

The wellbore additive may be formulated and configured to act as both a biocide and a scavenger downhole (e.g., within the wellbore 102, such as proximate the production tubing 110, the production casing 118, and/or proximate wellbore equipment; and/or within the earth formation 104). By way of non-limiting example, the wellbore additive may include an unsaturated aldehyde. Sulfur-containing species may react with the wellbore additive by acting as a weak nucleophile, such as by nucleophilic addition. For example, the sulfur atom of the sulfur-containing species (e.g., hydrogen sulfide) may act as a nucleophile and attach (via Michael addition) to the β carbon (e.g., the terminal unsaturated carbon) of the precursor wellbore additive 108 to form a β-mercaptoaldehyde, which may include a thiol-aldehyde. In embodiments where the scavenger material comprises propenal, the reaction product of hydrogen sulfide and the propenal comprises 2-mercaptoethanol ($HSCH_2CH_2CHO$). In some embodiments, the wellbore additive interacts with microorganisms in the wellbore 102 and/or the earth formation 104, reducing and/or preventing microbial activity, such as by controlling the growth rate of bacteria or other microorganisms and/or reducing the effects of microorganisms in the wellbore 102 and/or the earth formation 104. The wellbore additive may be formulated and configured to prevent and/or reduce microbial-induced corrosion, control biofilm formation, reduce reservoir souring, and/or reduce microbial growth on tubing, casings, liners, and other wellbore equipment. In some embodiments, the biocide is formulated and configured to treat microorganism induced corrosion and/or the effects of microorganism metabolisms, such as acids, scales, biofilm, and poisonous gases (e.g., hydrogen sulfide). In other words, the wellbore additive may be formulated and configured to treat at least one of the wellbore 102 and/or wellbore fluid for the presence of microorganisms or for the effects of microorganism metabolism, such as acid formation, scale formation, biofilm, and/or various gases). Without being bound by any particular theory, in some embodiments, the biocide is formulated and configured to bind to proteins and disable cell mechanisms of microorganisms within the wellbore 102 and/or the earth formation 104, oxidize microorganisms (e.g., cell walls, DNA, and other molecules), and/or damage or rupture cell membranes of microorganisms.

Accordingly, the wellbore additive that forms in-situ may be formulated and configured to reduce a concentration of the hydrogen sulfide and mercaptans and/or to reduce, prevent, and/or treat biofilms located in the wellbore 102, in wellbore fluids (e.g., produced fluids), and the earth formation 104. The wellbore additive may reduce corrosion of wellbore piping and equipment, may reduce the amount of hydrogen sulfide and mercaptans that are transported uphole to the surface 112, and/or may reduce the amount of biofilms present in the wellbore 102 and/or the earth formation 104.

Figure 4:
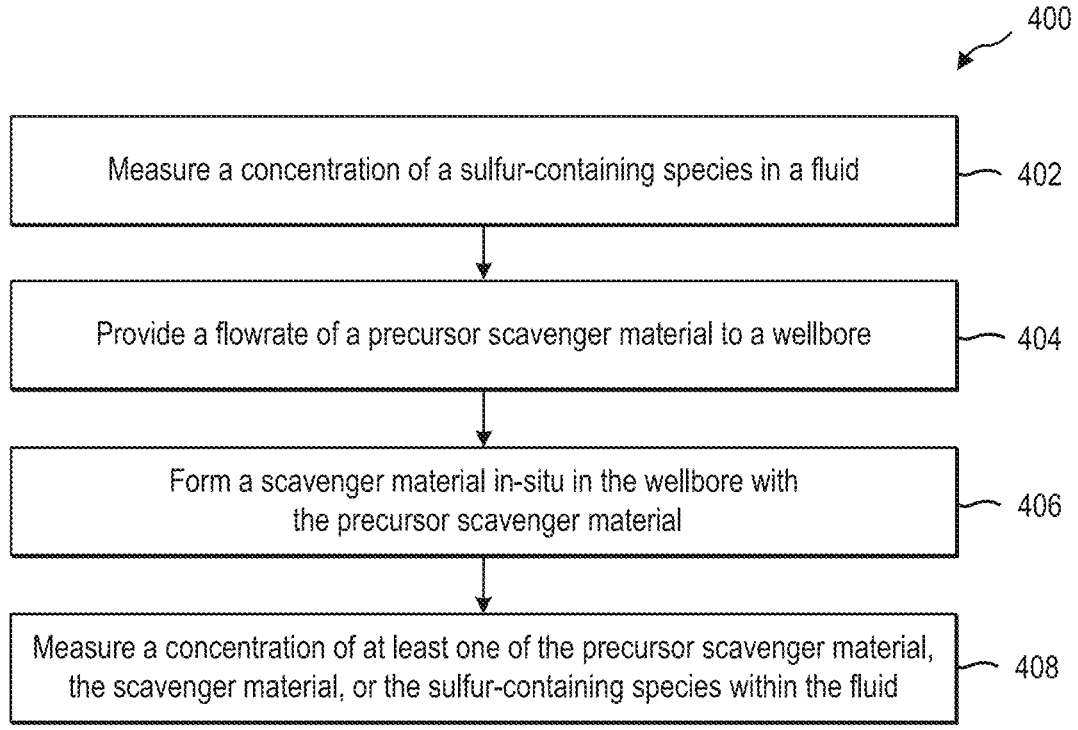
FIG. 4 is a simplified flow diagram illustrating a method of applying a precursor wellbore additive comprising a scavenger material to a wellbore, according to at least one embodiment of the disclosure.

FIG. 4 is a simplified flow diagram illustrating a method 400 of applying a precursor wellbore additive comprising a precursor scavenger material to a wellbore, according to at least one embodiment of the disclosure. The method 400 includes measuring a concentration of a sulfur-containing species in a fluid, as shown in act 402. The concentration of the sulfur-containing species may be measured downhole, such as within a wellbore 102. By way of non-limiting example, the concentration of the sulfur-containing species is measured with a sensor (e.g., sensor 142) located within the wellbore 102. In some embodiments, measuring the concentration of a sulfur-containing species includes measuring the concentration of the sulfur-containing species at the surface 112 (such as with sensor 148). In some embodiments, measuring the concentration of the sulfur-containing species includes measuring the concentration of more than one sulfur-containing species, such as measuring the concentration of hydrogen sulfide and the concentration of one or more mercaptans. In some embodiments, measuring the concentration of the sulfur-containing species includes measuring the concentration of the sulfur-containing species in a fluid, such as in a liquid, in a gas, or both, which may be located downhole or at the surface 112. In some embodiments, the fluid comprises a wellbore fluid, such as a produced fluid.

Responsive to measuring the concentration of the sulfur-containing species in the fluid, the method 400 further includes, based on the measured concentration of the sulfur-containing species, providing a flowrate of a precursor scavenger material to a wellbore, as shown in act 404. The flowrate of the precursor scavenger material may be determined based on the concentration of the sulfur-containing species measured in act 402. The precursor scavenger material may include one or more of the materials described above. For example, the precursor scavenger material may include one or more of an acetal or a hydroxyaldehyde.

In some embodiments, the precursor scavenger material is provided to the wellbore neat, such as without a carrier fluid. The concentration of the precursor scavenger material may be greater than about 90.0 weight percent, such as greater than about 95.0 weight percent, or greater than about 99.0 weight percent. In other embodiments, the precursor scavenger material is provided to the wellbore with a carrier fluid. The carrier fluid may include, for example, an alcohol. The composition of the carrier fluid may facilitate the solubility of the precursor scavenger material in an aqueous phase or an oleaginous phase. For example, in embodiments where the carrier fluid comprises methanol or ethanol, the precursor scavenger material may be soluble in the aqueous phase. In embodiments where the carrier fluid comprises, for example, a $C_5$ or higher alcohol, the precursor scavenger material may be soluble in the oleaginous phase.

The method 400 may further include forming a scavenger material in-situ in the wellbore with the precursor scavenger material, as shown in act 406. In some embodiments, forming the scavenger material in-situ includes forming the scavenger material by reacting the precursor scavenger material in the wellbore, such as with an acid, with water, or in the presence of an acid and/or water to form the scavenger material. Reacting the precursor scavenger material to form the scavenger material may include contacting the precursor scavenger material with an acid and/or water. The in-situ formed scavenger material may include one or more of the materials described above and may be formed as described above with reference to formation of the scavenger material from the precursor scavenger material. In some embodiments, the scavenger material is formed in-situ in the wellbore responsive to one or more of exposure of the precursor scavenger material to a pH lower than about 6.5, exposure of the precursor scavenger material to an acid (e.g., carbonic acid), or exposure to water in the wellbore. In some embodiments, the in-situ formed scavenger material comprises propenal.

In some embodiments, the method 400 further includes measuring a concentration of at least one of the precursor scavenger material, the scavenger material, or the sulfur-containing species within the fluid (e.g., at the surface 112), as shown in act 408. In some embodiments, the concentration of the at least one of the precursor scavenger material, the scavenger material, or the sulfur-containing species of the fluid is measured at the surface 112. The fluid may include a produced fluid.

In some embodiments, act 408 includes measuring the concentration of the sulfur-containing species in the produced fluid at the surface 112. The concentration and/or the flowrate of the precursor scavenger material may be adjusted based on the measured concentration of the sulfur-containing species in the produced fluid at the surface 112. For example, responsive to measuring a concentration of the sulfur-containing species in the produced fluid at the surface 112 greater than a predetermined threshold, the method 400 may include increasing a concentration or a flowrate of the precursor scavenger material provided to the wellbore of act 404. In some embodiments, responsive to a concentration of the scavenger material in the fluid at the surface 112 being less than a predetermined threshold, the method 400 may include increasing a concentration or a flowrate of the precursor scavenger material provided to the wellbore of act 404.

Accordingly, the method 400 may include forming a sulfur-containing species scavenger material in-situ within a wellbore. Since the scavenger material is formed in-situ, the scavenger material may facilitate reducing a concentration of one or more sulfur-containing species within a fluid (e.g., a wellbore fluid, a produced fluid) without exposing operating personnel to the scavenger material. In addition, the scavenger material may comprise one or more materials that are not used in wellbore operations since the scavenger material is formed downhole.

FIG. 5 is a simplified flow diagram illustrating a method 500 of applying a precursor wellbore additive comprising a precursor biocide to a wellbore, according to at least one embodiment of the disclosure. The method 500 includes measuring a microorganism concentration of a fluid, as shown in act 502. The microorganism concentration of the fluid may be measured downhole, such as within a wellbore 102. By way of non-limiting example, the microorganism concentration is measured with a sensor (e.g., sensor 142) located within the wellbore 102. In some embodiments, measuring the microorganism concentration includes measuring the concentration of the microorganisms at the surface 112 (such as with sensor 148). In some embodiments, measuring the microorganism concentration of the fluid includes measuring the concentration of more than one type or species of microorganism in the fluid. The fluid may be a liquid, a gas, or both, and may be located downhole or at the surface 112. In some embodiments, the fluid comprises a wellbore fluid, such as a produced fluid.

Measuring the microorganism concentration in the fluid may include measuring the microorganism concentration using a microorganism sensor, such as sensor 142 and/or sensor 148. In some embodiments, measuring the microorganism concentration includes measuring the microorganism concentration in-situ in real-time. For example, the microorganism concentration may be measured at a predetermined frequency using an in-line sensor configured to autonomously collect a sample of the fluid and determine the microorganism concentration of the fluid.

Responsive to measuring the microorganism concentration of the fluid, the method 500 further includes, based on the measured microorganism concentration, determining a concentration of biocide to apply to the fluid, as shown in act 504. The concentration of biocide to apply may correspond to or be proportional to a concentration of a biocide precursor to apply to the fluid (e.g., such as via the wellbore additive application system 106).

In some embodiments, the method 500 further includes providing a flowrate of a precursor biocide to a wellbore, as shown in act 506. The flowrate of the biocide precursor provided to the wellbore may be determined based on the determined concentration of biocide to apply to the fluid determined during act 504. The precursor biocide may include one or more of the materials described above. For example, the precursor biocide may include one or more of an acetal or a hydroxyaldehyde.

In some embodiments, the precursor biocide is provided to the wellbore neat, such as without a carrier fluid. The concentration of the precursor biocide may be greater than about 90.0 weight percent, such as greater than about 95.0 weight percent, or greater than about 99.0 weight percent. In other embodiments, the precursor biocide is provided to the wellbore with a carrier fluid. The carrier fluid may include, for example, an alcohol. The composition of the carrier fluid may facilitate the solubility of the precursor biocide in an aqueous phase or an oleaginous phase. For example, in embodiments where the carrier fluid comprises methanol or ethanol, the precursor biocide may be soluble in the aqueous phase. In embodiments where the carrier fluid comprises, for example, a $C_5$ or higher alcohol, the precursor biocide may be soluble in the oleaginous phase.

The method 500 may further include forming a biocide in-situ in the wellbore with the precursor biocide, as shown in act 508. In some embodiments, forming the biocide in-situ includes forming the biocide by reacting the precursor biocide in the wellbore, such as with an acid, with water, or in the presence of an acid and/or water to form the biocide. Reacting the precursor biocide to form the biocide may include contacting the precursor biocide with an acid and/or water. The in-situ formed biocide may include one or more of the materials described above and may be formed as described above with reference to formation of the biocide from the precursor biocide. In some embodiments, the biocide is formed in-situ in the wellbore responsive to one or more of exposure of the precursor biocide to a pH lower than about 6.5, exposure of the precursor biocide to an acid (e.g., carbonic acid), or exposure to water in the wellbore. In some embodiments, the in-situ formed biocide comprises propenal.

In some embodiments, the method 500 further includes measuring a concentration of at least one of the precursor biocide, the biocide, or the microorganisms within the fluid (e.g., at the surface 112), as shown in act 510. In some embodiments, the concentration of the at least one of the precursor biocide, the biocide, or the microorganisms of the fluid is measured at the surface 112. The fluid may include a produced fluid.

In some embodiments, act 510 includes measuring the microorganism concentration in the produced fluid at the surface 112. The microorganism concentration and/or the flowrate of the precursor biocide may be adjusted based on the measured microorganism concentration in the produced fluid at the surface 112. For example, responsive to measuring a microorganism concentration in the produced fluid at the surface 112 greater than a predetermined threshold, the method 500 may include increasing a concentration or a flowrate of the precursor biocide provided to the wellbore of act 506. In some embodiments, responsive to a biocide concentration in the fluid at the surface 112 being less than a predetermined threshold, the method 500 may include increasing a concentration or a flowrate of the precursor biocide provided to the wellbore of act 506.

Accordingly, the method 500 may include forming a biocide in-situ within a wellbore. Since the biocide is formed in-situ, the biocide may facilitate reducing a microorganism concentration within a fluid (e.g., a wellbore fluid, a produced fluid) and in the wellbore without exposing operating personnel to the biocide. In addition, the biocide may comprise one or more materials that are not used in wellbore operations since the biocide is formed downhole.

The embodiments of the wellbore additive application system 106, including the precursor wellbore additive 108, the sensor 142, and the sensor 148, have been primarily described with reference to wellbore operations; the wellbore additive application system 106 described herein may be used in applications other than the wellbore operations. In other embodiments, the wellbore additive application system 106 according to the present disclosure may be used outside a wellbore or other downhole environment used for the exploration or production of natural resources. Accordingly, the terms "wellbore," "borehole," and the like should not be interpreted to limit tools, systems, assemblies, or methods of the present disclosure to any particular industry, field, or environment. In addition, the wellbore fluids may be used in cased completion wellbores and in open hole completion wellbores.

The wellbore additive application system 106 may be used in wellbores used for hydrocarbon recovery, production of geothermal energy, injection of one or more chemicals into an earth formation and/or reservoir in the earth formation, carbon storage, or another purpose. In some embodiments, the wellbore additive application system 106 may be used for wellbores used for carbon capture, utilization, and storage (CCUS) and/or for recovery and use of geothermal energy.

Geothermal energy is a promising source of renewable energy that captures energy from heat generated within the earth. For example, geothermal energy may be used to heat structures (e.g., buildings) and/or to generate electricity (e.g., by heating water to generate steam and drive a turbine with the steam). The wellbore additive application system 106 described herein may be used to form wellbores used to circulate a fluid that is heated within the earth formation through which the wellbore extends. The heated fluid may be circulated to the surface where the captured heat may be recovered to heat a structure and/or generate electricity, followed by recirculation of the fluid to the earth formation to continue the cycle.

CCUS facilitates the capture, use, and/or storage of carbon (e.g., carbon dioxide), which has a goal of achieving carbon neutrality and/or net zero carbon emissions (NZE). CCUS may facilitate the capture of carbon dioxide from large point sources (e.g., power plants, refineries, cement plants, other industrial processing plants, or other industrial facilities that use fossil fuels, biomass fuels, or other fuels that generate carbon dioxide). The captured carbon dioxide may be converted into valuable products such as, for example, ethanol, sustainable aviation fuel, chemicals, and mineral aggregates. Alternatively, the carbon dioxide may be stored in geologic formations, such as in depleted hydrocarbon reservoirs. The carbon dioxide may be introduced into the earth formation through a wellbore that uses or used the wellbore additive application system 106 during operations or formation thereof.

EXAMPLES

Example 1

The scavenging efficiency of different precursor scavenger materials for scavenging hydrogen sulfide was measured. A test gas including hydrogen sulfide, carbon dioxide, and nitrogen was sparged through a sparger in a container including a precursor scavenger material. The test gas included 84 mL/minute of 1.5 volume percent hydrogen sulfide in nitrogen and 36 mL/minute of 10 volume percent carbon dioxide in nitrogen. The test gas flowed into the liquid, after which the outlet gas of the container was analyzed with a gas chromatograph (GC) to measure the concentration of hydrogen sulfide in the outlet gas. Before sparging the test gas through the container including the precursor scavenger material, the test gas bypassed the container and was directed to the gas chromatograph. After the piping was purged with the test gas for a duration, the test gas was sparged in the container to contact the precursor scavenger material.

Figure 6A:
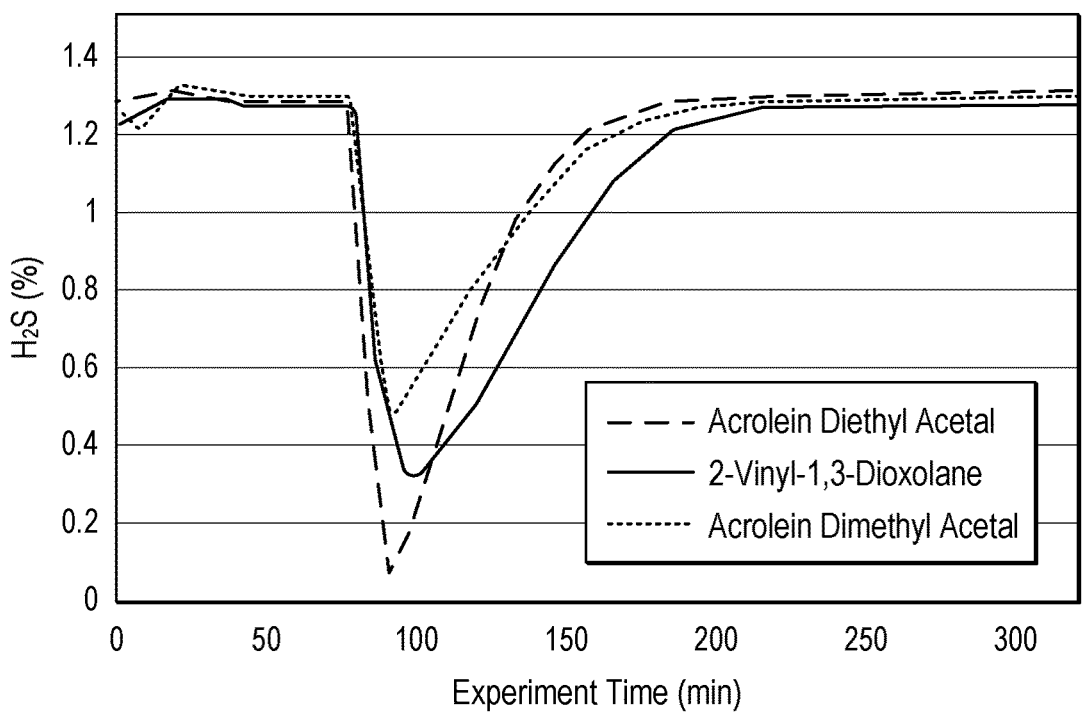
FIG. 6A is a graph illustrating the concentration of hydrogen sulfide in an outlet gas as a function of time when scavenging hydrogen sulfide using different precursor scavenger materials.

Three precursor scavenger materials were tested including acrolein diethyl acetal, 2-vinyl-1,3-dioxolane (also known as acrolein ethylene glycol acetal or acrolein ethylene acetal), and acrolein dimethyl acetal. FIG. 6A is a graph illustrating the concentration of hydrogen sulfide in the outlet gas as a function of time when using the different precursor scavenger materials; and FIG. 6B is a graph illustrating the concentration of carbon dioxide in the outlet gas as a function of time.

Figure 6B:
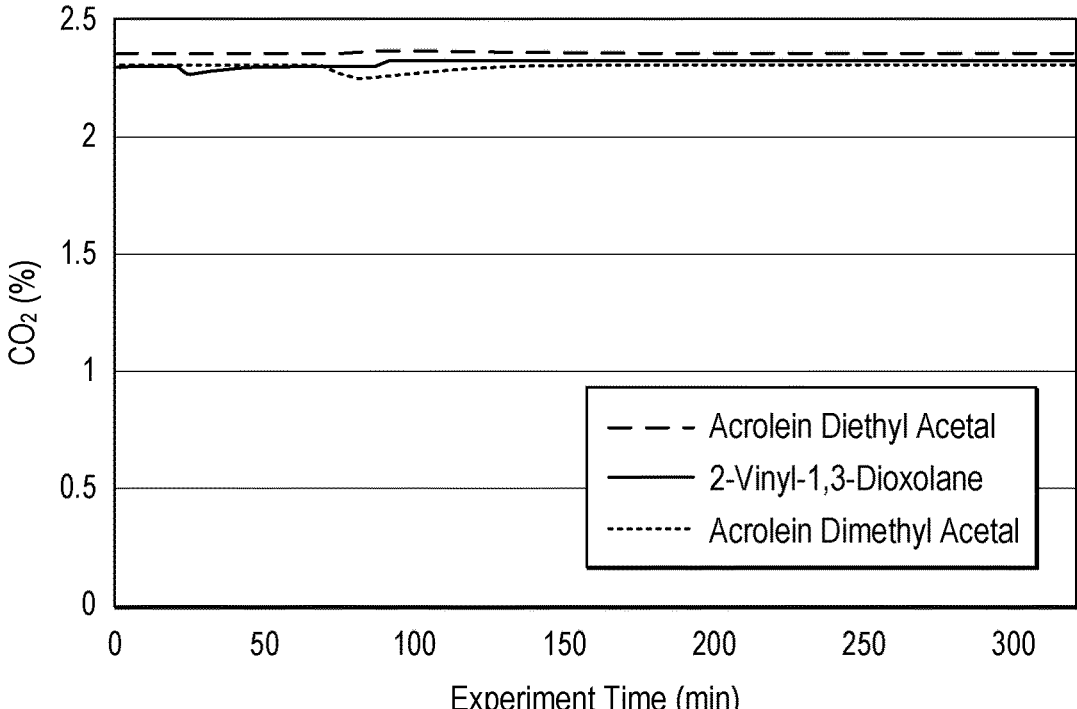
FIG. 6B is a graph illustrating the concentration of carbon dioxide in the outlet gas as a function of time when using the different precursor scavenger materials.

In FIG. 6A and FIG. 6B, the precursor scavenger materials were injected into the container after about 75 minutes, as can be seen in the decrease in the hydrogen sulfide concentration beginning at about 75 minutes. With reference to FIG. 6A, the concentration of hydrogen sulfide in the outlet gas initially decreased, and with reference to FIG. 6B, the concentration of carbon dioxide in the outlet gas was unchanged. Table 1 below shows the calculated hydrogen sulfide uptake of each of the precursor scavenger materials tested. Over the duration, the 2-vinyl-1,3-dioxolane decreased the concentration of the hydrogen sulfide the most. The acrolein diethyl acetal significantly decreased the concentration of hydrogen sulfide more than the acrolein dimethyl acetal.

TABLE 1

| Precursor scavenger material | Injection volume (mL) | Uptake (mg $H_2S$/mL scavenger) | |
| --- | --- | --- | --- |
| | | In first hour | Entire period |
| Acrolein diethyl acetal | 1 | 54.1 | 61.0 |
| 2-vinyl-1,3-dioxolane | 1 | 54.1 | 65.1 |
| Acrolein dimethyl acetal | 1 | 39.6 | 49.3 |

While the 2-vinyl-1,3-dioxolane exhibited slightly better uptake of the hydrogen sulfide than the acrolein diethyl acetal, precipitation was observed in the container including the 2-vinyl-1,3-dioxolane. The precipitates formed an insoluble polymeric-like substance on the surface of the test fluid. There were no solids observed for the acrolein diethyl acetal or the acrolein dimethyl acetal. Thus, the acrolein diethyl acetal and the 2-vinyl-1,3-dioxolane were determined to be effective hydrogen sulfide scavengers over short durations. The 2-vinyl-1,3-dioxolane exhibited slightly higher hydrogen sulfide uptake than the acrolein diethyl acetal over the entire test period but formed insoluble precipitates.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A method for applying a biocide to a wellbore, the method comprising:

providing a precursor biocide to a location within the wellbore, the wellbore extending through an earth formation, the precursor biocide comprising at least one of acrolein diethyl acetal, acrolein ethylene glycol acetal, or 3-hydroxypropanal; and reacting the precursor biocide in the wellbore or the earth formation in-situ to form the biocide, the biocide comprising propenal.

2. The method of claim 1, further comprising treating the wellbore for effects of microorganisms using the biocide.

3. The method of claim 1, wherein reacting the precursor biocide comprises contacting the precursor biocide with an acid to react the precursor biocide in the wellbore or the earth formation to form the biocide.

4. The method of claim 3, wherein contacting the precursor biocide with the acid comprises contacting the precursor biocide with carbonic acid.

5. The method of claim 1, wherein the precursor biocide comprises a reaction product of formaldehyde and another aldehyde.

6. The method of claim 5, wherein the another aldehyde comprises acetaldehyde.

7. The method of claim 1, wherein the precursor biocide comprises a reaction product of propenal and an alcohol.

8. The method of claim 1, wherein the precursor biocide comprises a reaction product of propenal and a diol and comprises a cyclic ring.

9. The method of claim 1, further comprising:

measuring a microorganism concentration in the wellbore; and providing a concentration of the precursor biocide to the wellbore based on the measured microorganism concentration.

10. The method of claim 1, wherein forming the biocide comprises forming the biocide without exposing personnel to the biocide.

11. A method of applying a biocide to a wellbore, the method comprising:

providing a precursor biocide to a location within the wellbore, the wellbore extending through an earth formation, the precursor biocide comprising at least one of acrolein diethyl acetal, acrolein ethylene glycol acetal, or 3-hydroxypropanal; and responsive to exposure to an acid or water in the wellbore, forming the biocide in the wellbore from the precursor biocide, the biocide comprising propenal.

12. The method of claim 11, further comprising:

measuring a microorganism concentration of a fluid associated with the wellbore; and adjusting a flowrate of the precursor biocide based on the measured microorganism concentration.

13. The method of claim 12, wherein measuring the microorganism concentration of the fluid associated with the wellbore comprises measuring the microorganism concentration downhole or measuring the microorganism concentration in a produced fluid.

14. The method of claim 11, wherein forming the biocide in the wellbore from the precursor biocide comprises exposing the precursor biocide to carbonic acid in the wellbore.

15. A system for providing a biocide to a wellbore, the system comprising:

an injection pump in fluid communication with a precursor biocide, the precursor biocide comprising at least one of acrolein diethyl acetal, acrolein ethylene glycol acetal, or 3-hydroxypropanal; and wellbore piping in fluid communication with the injection pump and configured to provide the precursor biocide to a downhole location.

* * * * *